United States Patent [19]
Snitgen et al.

[11] Patent Number: 5,306,095
[45] Date of Patent: Apr. 26, 1994

[54] VEHICLE STEERING LINK ASSEMBLY

[75] Inventors: David N. Snitgen, Portland; Jim L. Torrey, Grand Ledge, both of Mich.

[73] Assignee: TRW Inc., Lyndhurst, Ohio

[21] Appl. No.: 776,801

[22] Filed: Oct. 15, 1991

[51] Int. Cl.⁵ ............................ F16B 2/02; F16B 7/04
[52] U.S. Cl. .................................. 403/290; 403/354; 403/344; 24/205
[58] Field of Search ............. 403/290, 354, 344, 343, 403/43, 46; 24/274 WB, 279, 295

[56] References Cited

U.S. PATENT DOCUMENTS

| | | | |
|---|---|---|---|
| 2,640,145 | 5/1953 | Martt | 403/290 X |
| 2,696,397 | 12/1954 | Booth | 403/46 |
| 3,498,652 | 3/1970 | Cass | 403/43 |
| 3,801,207 | 9/1974 | Herbenar et al. | 403/46 |

FOREIGN PATENT DOCUMENTS 0543719 7/1957 Canada ........................ 403/290

Primary Examiner—Randolph A. Reese
Assistant Examiner—George D. Spisich
Attorney, Agent, or Firm—Tarolli, Sundheim & Covell

[57] ABSTRACT

A vehicle steering linkage includes an intermediate tube which extends across the vehicle between the steerable wheels of the vehicle. The intermediate tube transmits steering force from one steerable wheel of the vehicle to the steerable wheel on the opposite side of the vehicle. The ends of the intermediate tube are internally threaded and receive externally threaded portions of other parts of the vehicle steering linkage. A clamp placed around each threaded connection is tightened to prevent relative rotation between the threadedly interconnected parts. A plurality of retaining rings swaged on the intermediate tube locate the clamps axially on the intermediate tube. When the clamps are not tightened they can rotate freely on the intermediate tube between the retaining rings.

5 Claims, 2 Drawing Sheets

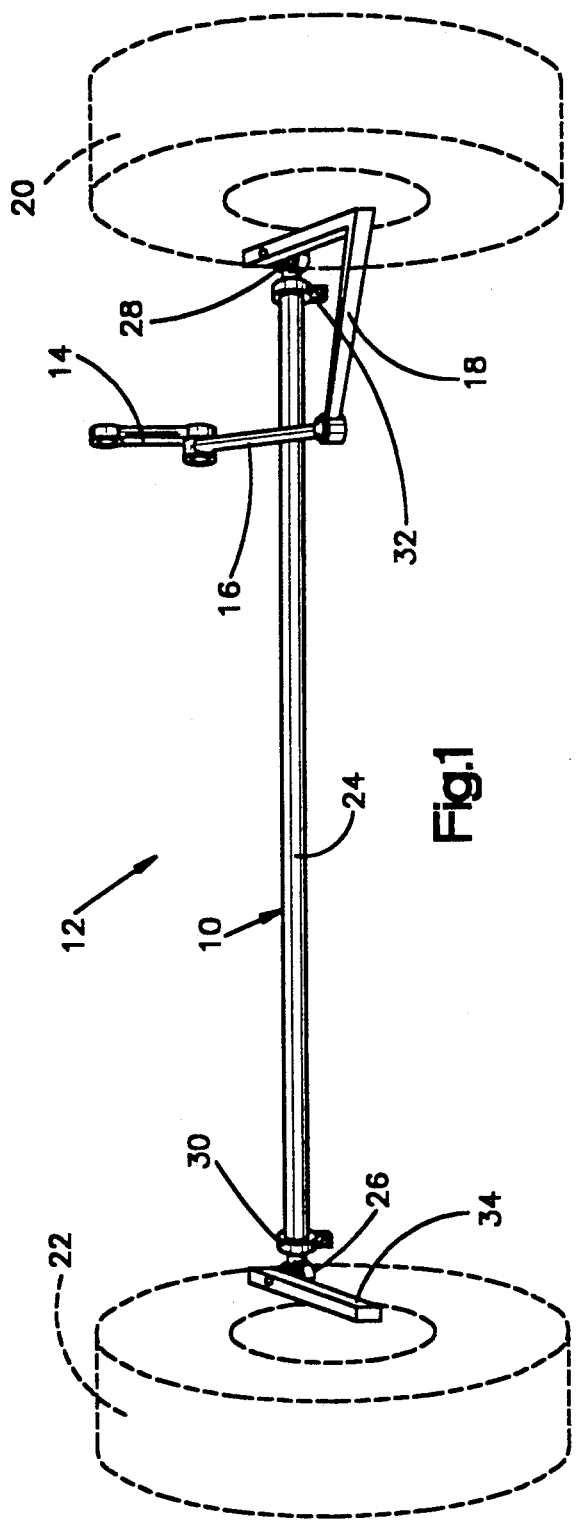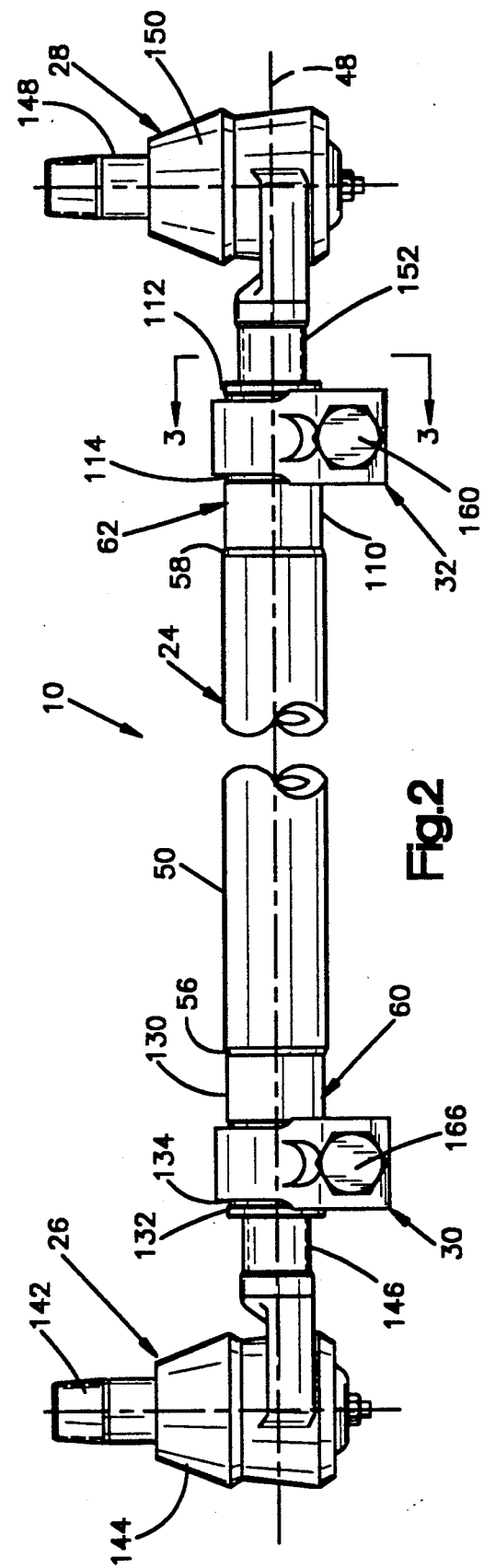

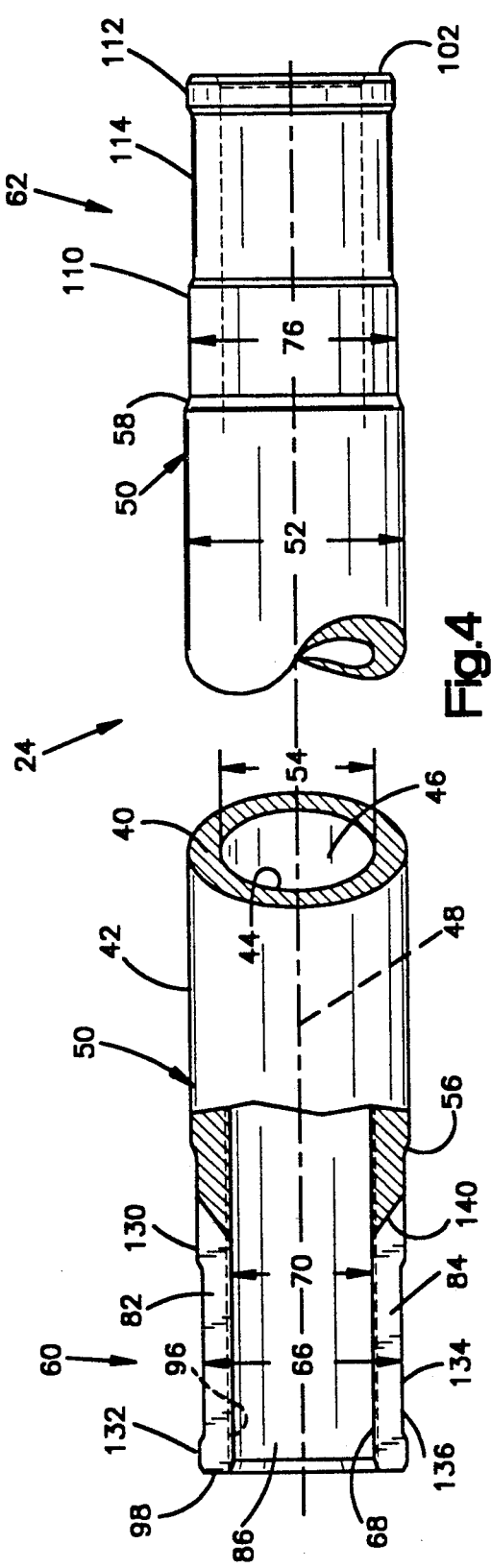
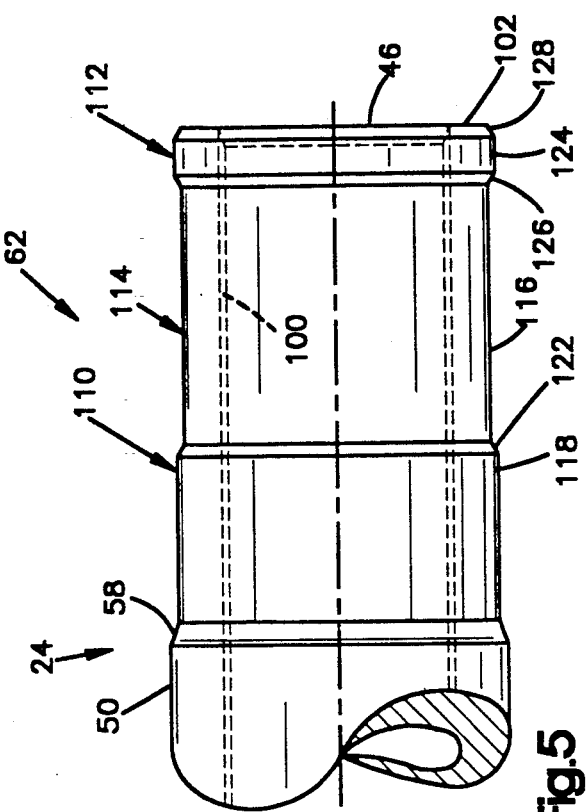
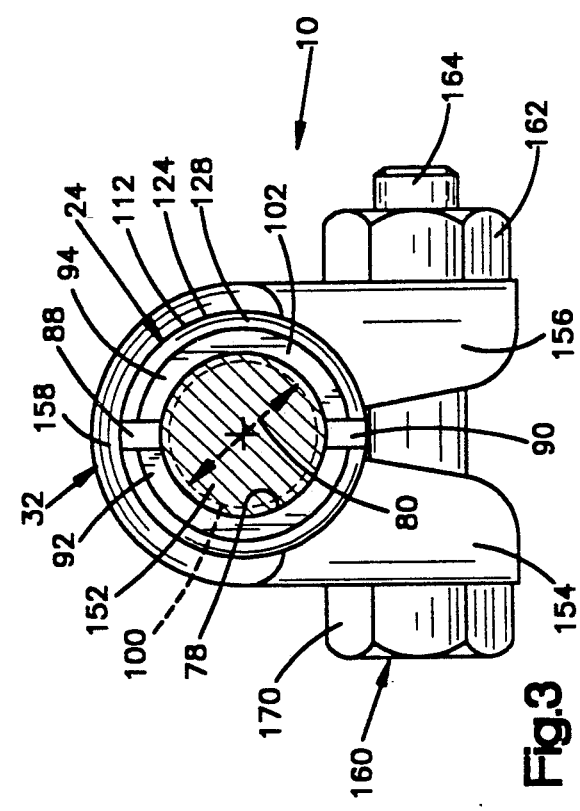

VEHICLE STEERING LINK ASSEMBLY

BACKGROUND OF THE INVENTION

1. Technical Field

The present invention relates to a vehicle steering link assembly. In particular, the present invention relates to a vehicle steering link assembly which extends between two steerable wheels of a vehicle and which is adjustable in length.

2. Description of the Prior Art

Vehicle steering linkage connects the steering gear of a vehicle with the steerable wheels of the vehicle. The steering linkage includes one or more links which transmit steering force from the steering gear to the steerable wheels, to turn the steerable wheels in response to a driver input to the steering gear.

Medium to large trucks, such as Class 4 to Class 8 trucks, commonly employ a cross steer linkage. In a cross steer linkage, a drag link transmits steering force from the steering gear to the steerable wheel nearest the steering gear. A tie rod assembly including an intermediate tube extends across the vehicle from that steerable wheel to the steerable wheel on the opposite side of the vehicle. The intermediate tube transmits steering force to the steerable wheel on the opposite side of the vehicle.

In this known steering linkage, the ends of the intermediate tube commonly are internally threaded and receive externally threaded portions of parts attached to the steerable wheels. The threads on the opposite ends of the intermediate tube are of opposite hand. Thus, the overall length of the tie rod assembly is adjustable by rotation of the intermediate tube about its axis. This adjustment is used to set the toe of the steerable wheels of the vehicle.

It is common to employ a clamp placed around each threaded connection to prevent relative rotation between the intermediate tube and the threadedly connected parts once the vehicle toe is set. These clamps must be located axially a specific distance from the end of the intermediate tube in order to clamp properly. The clamps must also be free to rotate about the intermediate tube when loosened, so that the clamps may be set in a desired rotational position regardless of the rotational position of the intermediate tube, to avoid contact with other parts of the vehicle.

In a known method of making an intermediate tube for a medium to large truck such as a Class 4 to Class 8 truck, the end portions of a parent tube are reduced in diameter by swaging to a size selected to receive a vehicle part of a particular outer diameter. On each end portion, short beads of weld material are placed on the outer circumferential surface of the intermediate tube, on either side of the clamp location, to locate the clamp axially on the tube while still allowing the clamp to rotate. The beads of weld material extend circumferentially only for a small distance around the intermediate tube. This welding process adds a separate operation to the other operations needed in forming the tube, and is relatively expensive and time consuming. Thus, it is desirable to be able to locate the clamp axially on the intermediate tube in another manner.

U.S. Pat. No. 3,801,207 shows one manner of locating a clamp axially on a tubular member in a vehicle steering linkage. Several protuberances are stamped in a piece of sheet steel which is then curled into a tubular shape to form a turnbuckle. A clamp placed around a threaded connection between the turnbuckle and a tie rod end is tightened to prevent relative rotation between the threadedly interconnected parts. The protuberances stamped in the sheet steel are received in a channel in the clamp. The protuberances and the channel cooperate to block axial movement of the clamp relative to the turnbuckle. The clamp is rotatable on the turnbuckle.

On an intermediate tube for a medium to large truck, such as a Class 4 to Class 8 truck, it is not feasible to locate a clamp axially in the manner shown in U.S. Pat. No. 3,801,207. This is because an intermediate tube for such a vehicle is typically five feet or more in length, 1¼" or more in diameter, and has a wall thickness of up to ⅜". It is not feasible to stamp protuberances in such material, to cold form such a part, or to make a die set over five feet long to stamp and curl such a part.

SUMMARY OF THE INVENTION

The present invention is a vehicle steering link assembly. The assembly includes an intermediate tube for extending between the steerable wheels of a vehicle to transmit steering force from a first steerable wheel of the vehicle to a second steerable wheel on the opposite side of the vehicle. The intermediate tube has a slitted end. A part is received in the slitted end of the intermediate tube and is adjustable relative to the intermediate tube. A clamp is on the slitted end of the intermediate tube and clamps the intermediate tube and the part together. The clamp, when released, is rotatable relative to the intermediate tube and to the part. A pair of axially spaced retaining rings swaged on the intermediate tube are located on opposite axial sides of the clamp to restrict axial movement of the clamp.

The swaged retaining rings each extend 360° circumferentially around the slitted end of the intermediate tube. The slitted end of the intermediate tube has the same inner diameter at locations axially coincident with the swaged retaining rings as at locations spaced axially from the swaged retaining rings.

BRIEF DESCRIPTION OF THE DRAWINGS

The foregoing and other features of the present invention will become apparent to one skilled in the art upon a consideration of the following description of a preferred embodiment of the invention with reference to the accompanying drawings, wherein:

FIG. 1 is a view of a vehicle steering linkage including a vehicle steering link assembly in accordance with the present invention;

FIG. 2 is a front elevational view of the vehicle steering link assembly of FIG. 1;

FIG. 3 is a sectional view taken along line 3—3 of FIG. 2 with parts removed;

FIG. 4 is a view, partially in section, of an intermediate tube forming part of the vehicle steering link assembly of FIG. 2; and FIG. 5 is an enlarged view of one end portion of the intermediate tube of FIG. 4.

DESCRIPTION OF A PREFERRED EMBODIMENT OF THE INVENTION

The present invention relates to a vehicle steering link assembly and particularly to a vehicle steering link assembly which extends between two steerable wheels of a vehicle and which is adjustable in length. The present invention is applicable to various vehicle steering link constructions.

As representative of the present invention, FIG. 1 illustrates a tie rod assembly 10. The tie rod assembly 10 is part of a vehicle steering linkage designated generally 12. The steering linkage 12 is a typical steering linkage as used in a medium to large truck, such as a Class 4 to Class 8 truck. The steering linkage 12 includes a Pitman arm 14 drivingly connected to a steering gear (not shown). A drag link 16 extends between the Pitman arm 14 and a steering arm 18. The steering arm 18 is attached to a first steerable wheel 20 of the vehicle.

The tie rod assembly 10 extends across the vehicle from the first steerable wheel 20 to a second steerable wheel 22. The tie rod assembly 10 includes an intermediate tube 24, a pair of vertical socket assemblies 26 and 28, and a pair of clamps 30 and 32. The vertical socket assembly 28 connects one end of the intermediate tube 24 to the steering arm 18 attached to the first steerable wheel 20. The vertical socket assembly 26 connects the other end of the intermediate tube 24 to a steering arm 34 attached to the second steerable wheel 22.

Driver input to the steering gear causes the Pitman arm 14 to move the drag link 16 in a fore and aft direction. The drag link 16 transmits steering force to the steering arm 18 and thus to the first steerable wheel 20. The tie rod assembly 10 transmits steering force from the steering arm 18 and the first steerable wheel 20, across the vehicle, to the steering arm 34 and thus to the second steerable wheel 22.

The intermediate tube 24 (FIG. 4) is a tubular member having a tube wall 40 with a cylindrical outer surface 42 and a cylindrical inner surface 44. The cylindrical inner surface 44 defines a central opening 46 extending along the axis 48 of the intermediate tube 24.

The intermediate tube 24 has a central portion 50. The central portion 50 has an outer diameter represented by the arrow 52 and an inner diameter represented by the arrow 54. Two shoulder portions 56 and 58 of the intermediate tube 24 are located axially outward of the central portion 50. The shoulder portions 56 and 58 each have a tapering outer diameter.

Two reduced diameter end portions 60 and 62 of the intermediate tube 24 are located axially outward of the shoulder portions 56 and 58, respectively. The end portion 60 has a cylindrical outer surface with an outer diameter represented by the arrow 66. The outer diameter 66 of the end portion 60 is less than the outer diameter 52 of the central portion 50 of the intermediate tube 24. The end portion 60 has a cylindrical inner surface 68 with an inner diameter represented by the arrow 70. The inner diameter 70 of the end portion 60 is less than the inner diameter 54 of the central portion 50 of the intermediate tube 24.

The end portion 62 of the intermediate tube 24 is a mirror image of the end portion 60. The end portion 62 has a cylindrical outer surface with an outer diameter represented by the arrow 76. The outer diameter 76 of the end portion 62 is less than the outer diameter 52 of the central portion 50. The end portion 62 has a cylindrical inner surface 78 (FIG. 3) with an inner diameter represented by the arrow 80. The inner diameter 80 of the end portion 62 is less than the inner diameter 54 of the central portion 50 of the intermediate tube 24.

Each end portion 60 and 62 of the intermediate tube 24 is slitted. In the end portion 60, a pair of axially extending slits 82 and 84 (FIG. 4) are diametrically opposed and divide the tube wall 40 into two roughly semi-circular wall portions, one of which is seen in FIG. 4 and is designated 86. In the end portion 62, two axially extending slits 88 and 90 (FIG. 3) divide the tube wall 40 into two roughly semi-circular wall portions 92 and 94. It is contemplated that each end portion 60 and 62 may have a number of slits other than two. For example, each end portion may have only one axially extending slit, the end portion thus being C-shaped in end view.

The cylindrical inner surface of each end portion 60 and 62 is threaded. In the end portion 60, a thread 96 (FIG. 4) extends axially inwardly from the end face 98 and into the central portion 50 of the intermediate tube 24. Similarly, in the end potion 62, a thread 100 extends axially inwardly from the end face 102 of the end portion 62. The thread 100 extends through the slitted end portion 62, and into the central portion 50 of the intermediate tube 24.

The thread 96 on the end portion 60, and the thread 100 on the end portion 62, are of opposite hand. Thus, the overall length of the tie rod assembly 10 (FIGS. 1 and 2) is adjustable by rotation of the intermediate tube 24 about the axis 48. Rotation of the intermediate tube 24 in one direction about the axis 48 brings the vertical socket assemblies 26 and 28 closer to each other. Rotation of the intermediate tube 24 in the opposite direction about the axis 48 moves the vertical socket assemblies 26 and 28 farther apart from each other. This adjustment is used to set the toe of the steerable wheels 20 and 22.

The end portion 62 of the intermediate tube 24 includes a pair of swaged retaining rings 110 and 112 (FIG. 5). The retaining rings 110 and 112 define between them a clamping portion 114 having a cylindrical clamping surface 116. The retaining rings 110 and 112 are each larger in diameter than the clamping surface 114. The inner retaining ring 110 has an annular outer surface 118 which extends to the tapered surface of the shoulder portion 58. A sloping side surface 122 extends between the outer surface 118 and the clamping surface 116 of the end portion 62.

Similarly, the outer retaining ring 112 has an annular outer surface 124. A sloping side surface 126 extends between the outer surface 124 and the clamping surface 116. A sloping side surface 128 extends between the outer surface 124 and the axial end face 102 of the end portion 62 of the intermediate tube 24.

The end portion 60 (FIG. 4) of the intermediate tube 24 likewise includes an inner retaining ring 130 and an outer retaining ring 132. The retaining rings 130 and 132 are similar to the retaining rings 110 and 112. The outer retaining ring 132 is located adjacent the axial end face 98 of the intermediate tube 24. The retaining rings 130 and 132 define between them a clamping portion 134 having a cylindrical outer surface 136. The retaining rings 130 and 132 are each larger in diameter than the clamping portion 134.

The retaining rings 110, 112, 130, and 132 are swaged from the material of the intermediate tube 24. The intermediate tube 24 is made from a parent tube (not shown) having a selected outer diameter and wall thickness and cut to a desired length. A parent tube is selected which is large enough in diameter and in wall thickness to provide the needed buckling strength for the intermedi7 ate tube 24. The end portions of the parent tube are then reduced in diameter as described below to a size selected to receive a particular vehicle part of a particular outer diameter. Even though the end portions are reduced in diameter, the central portion 50 retains its larger outer and inner diameters and consequently retains its buckling strength.

To form the swaged retaining rings 110, 112, 130, and 132, each end portion of the parent tube is placed inside a set of four dies (not shown). Each die extends approximately 90° circumferentially around the outside of the parent tube. The parent tube is rotated while the dies are repeatedly forced inwardly against the parent tube. This swaging process reduces both the outer diameter and the inner diameter of the end portion of the parent tube. The swaging dies have recesses formed in their inner surfaces. The recesses are complementary in shape to the retaining rings 110, 112, 130 and 132 to be formed on the intermediate tube 24. The recesses are larger in diameter than the remainder of the inner surfaces of the dies.

Thus, as the outer diameter of the parent tube is reduced, the retaining rings 110, 112, 130 and 132 are formed. The retaining rings 110, 112, 130, and 132 each extend 360° circumferentially around the intermediate tube 24. The inner diameter of the parent tube is reduced in diameter evenly along the entire length of the end portions 60 and 62. The material of the parent tube evens out along the inside diameter of the parent tube during the swaging process.

The inner diameter of each end portion 60 and 62 is then reamed to the minor diameter of the threads 96 and 100, respectively. The threads 96 and 100 are cut in the intermediate tube 24. The slits 82, 84, 88, and 90 are pierced or cut in the end portions 60 and 62 of the intermediate tube 24. If a rotating cutting tool is used, the slits may have a curved or tapered end as illustrated at 140 in FIG. 4.

Intermediate tubes like the intermediate tube 24 are feasibly made as described herein having an outer diameter of ⅞ inch to 2½ inches, a wall thickness of 3/16 inch to ⅜ inch, and a length of one foot to eight feet. The intermediate tube 24 is preferably made of SAE 1012 carbon steel and may also be made from SAE 1022 carbon steel modified with alloying materials. An exemplary intermediate tube 24 as illustrated herein is made from a parent tube having a cut length of about five feet, a wall thickness of about ¼ inch, and an outer diameter of about 1½ inches. The exemplary intermediate tube has an overall length of 62.75 inches. The central portion of the intermediate tube has an outer diameter of 1.50" and an inner diameter of 1". The swaged retaining rings have an outside diameter of 1.44", and the clamping portions between the retaining rings have an outside diameter of 1.38". The insides of the slitted end portions are reamed and threaded to accept a threaded rod portion having a major diameter of 1" and a thread pitch of 16 threads per inch. The slits are 0.190" wide and 1.70" long.

The end portions 60 and 62 of the intermediate tube 24 receive the vertical socket assemblies 26 and 28. The vertical socket assembly 26 (FIG. 2) includes a ball stud 142 received in a socket 144. A threaded rod portion 146 projects from the socket 144. The threaded rod portion 146 is rotatably threaded into the thread 96 of the slitted end portion 60 of the intermediate tube 24. Similarly, the vertical socket assembly 28 includes a ball stud 148 received in a socket 150. A threaded rod portion 152 projects from the socket 150. The threaded rod portion 152 is rotatably threaded into the thread 100 of the slitted end portion 62 of the intermediate tube 24.

The clamps 30 and 32 (FIGS. 1-3) which secure the vertical socket assemblies 26 and 28 to the intermediate tube 24 are C-shaped and each include two flange portions 154 and 156 joined by a strap portion 158. A bolt 160 (FIGS. 2 and 3) extends through aligned openings (not shown) in the flange portions 154 and 156 of the clamp 32. A lock nut 162 is threaded onto a threaded end portion 164 of the bolt 160. Similarly, a bolt 166 (FIG. 2) extends through the flange portions of the clamp 30, and a lock nut (not shown) secures the bolt 166 to the clamp 30.

The clamp 32 secures the threaded connection between the intermediate tube 24 and the vertical socket assembly 28. The clamp 32 is positioned on the clamping portion 114 of the slitted end portion 62 of the intermediate tube 24. The lock nut 162 is then tightened on the bolt 160. The lock nut 162 and the head 170 of the bolt 160 squeeze together the two flange portions 154 and 156 of the clamp 32. This clamping action squeezes the two wall portions 92 and 94 of the slitted end portion 62 radially inwardly on the rod portion 152 of the vertical socket assembly 28. The rod portion 152 is clamped between the wall portions 92 and 94, blocking relative rotation between the vertical socket assembly 28 and the intermediate tube 24.

The other vertical socket assembly 26 (FIG. 2) is similarly secured to the intermediate tube 24 by the clamp 30. The clamp 30 is pressed axially over the outer retaining ring 132 and into position on the clamping portion 134 of the intermediate tube 24. The bolt 166 tightens the clamp 30 on the slitted end portion 60 of the intermediate tube 24. This clamping action squeezes the slitted end portion 60 radially inwardly on the rod portion 146 of the socket assembly 26, blocking relative rotation between the socket assembly 26 and the intermediate tube 24.

To obtain the best clamping effect, the clamps 30 and 32 are preferably located within about ¼ inch of the axial end faces of the intermediate tube 24. Thus, the outer retaining rings 112 and 132 are preferably located, as illustrated, adjacent the axial end faces 102 and 98, respectively, of the intermediate tube 24.

The retaining rings 110, 112, 130, and 132 are larger in diameter than the clamping surfaces on which the clamps 30 and 32 are seated. Therefore, the retaining rings 110, 112, 130, and 132 block axial movement of the clamps 30 and 32 on the intermediate tube 24. As a result, the clamps 30 and 32 can be maintained in a selected axial position on the tie rod or drag link assembly 10 when installed in the vehicle steering linkage 12, to avoid engaging other parts of the vehicle during steering movement. Also, the clamps 30 and 32, when loosened, are freely rotatable on the clamping portions 134 and 114, respectively, of the intermediate tube 24. Thus, if the intermediate tube 24 is rotated about the axis 48 to adjust the vehicle toe, the clamps 30 and 32 may still be rotatably positioned to avoid engagement with other parts of the vehicle.

From the above description of the invention, those skilled in the art will perceive improvements, changes and modifications in the invention. Such improvements, changes and modifications within the skill of the art are intended to be covered by the appended claims.

We claim:

1. A vehicle steering link assembly comprising:
   an intermediate tube for extending between the steerable wheels of a vehicle to transmit steering force from a first steerable wheel of the vehicle to a second steerable wheel of the vehicle on the opposite side of the vehicle, said intermediate tube being made of one homogeneous piece of metal and having a slitted end portion including surfaces defining two axially extending slits defining between them two generally semi-circular wall portions of said tube, said tube having inwardly of the inner ends of the slits a continuous wall portion;

a vehicle part received in said slitted end portion of said intermediate tube and adjustable relative to said intermediate tube; and a clamp on said slitted end portion of said intermediate tube, said clamp having a first condition in which said clamp squeezes said wall portions radially inwardly and clamps said intermediate tube and said vehicle part together and a second condition in which said clamp is released and is rotatable relative to said intermediate tube and to said vehicle part to enable adjustment of said intermediate tube relative to said vehicle part;

said intermediate tube having an axially outer first tubular portion comprising a first retaining ring on one axial side of said clamp, an axially inner second tubular portion comprising a second retaining ring on the other axial side of said clamp, and a third tubular portion disposed axially intermediate said first and second tubular portions and on which said clamp is located, said first and second tubular portions having an outer diameter greater than the outer diameter of said third tubular portion, said first and second and third tubular portions of said intermediate tube being of the same homogeneous piece of metal as the remainder of said intermediate tube;

said continuous wall portion of said intermediate tube being contiguous with said inner retaining ring and forming an axially inner boundary of said inner retaining ring and having an outer diameter larger than the outer diameter of said inner retaining ring;

said slitted end portion of said intermediate tube having the same inner diameter at locations axially coincident with said retaining rings as at locations spaced axially from said retaining rings;

said retaining rings engaging opposite axially outer surfaces of said clamp to restrict axial movement of said clamp on said intermediate tube when said clamp is in the first and second conditions.

2. An assembly as defined in claim 1 wherein said intermediate tube is made from a parent tube having a wall diameter of from about 3/16" to about ⅜", an outside diameter of from about ⅞" to about 2½", and a length of from about one foot to about eight feet, said continuous wall portion being free of joints.

3. An assembly as defined in claim 1 wherein said intermediate tube has a central portion and a second slitted end portion, a second vehicle part being received in said second slitted end portion of said intermediate tube and being adjustable relative to said intermediate tube;

said assembly including a second clamp located on said second slitted end portion of said intermediate tube to clamp said intermediate tube and said second vehicle part together, said second clamp when released being rotatable relative to said intermediate tube and to said second vehicle part; and said assembly including a second pair of axially spaced retaining rings on said intermediate tube and located on opposite axial sides of said second clamp to restrict axial movement of said clamp.

4. An assembly as defined in claim 3 wherein each of said first and second slitted end portions of said intermediate tube is smaller in diameter than said central portion of said intermediate tube, said retaining rings being formed by swage dies which simultaneously reduce the diameter of said tube ends and form said retaining rings.

5. An assembly as defined in claim 1 wherein said slitted end portion of said intermediate tube has a constant diameter cylinder inner surface which is internally threaded and which rotatably receives an externally threaded portion of said vehicle part, said clamp being axially coincident with at least a portion of the internal threads on said intermediate tube.

* * * * *